Oct. 26, 1926.
I. GREENHUT
1,604,342
AUTOMATIC HEAT REGULATING APPARATUS
Filed April 22, 1925    2 Sheets-Sheet 1
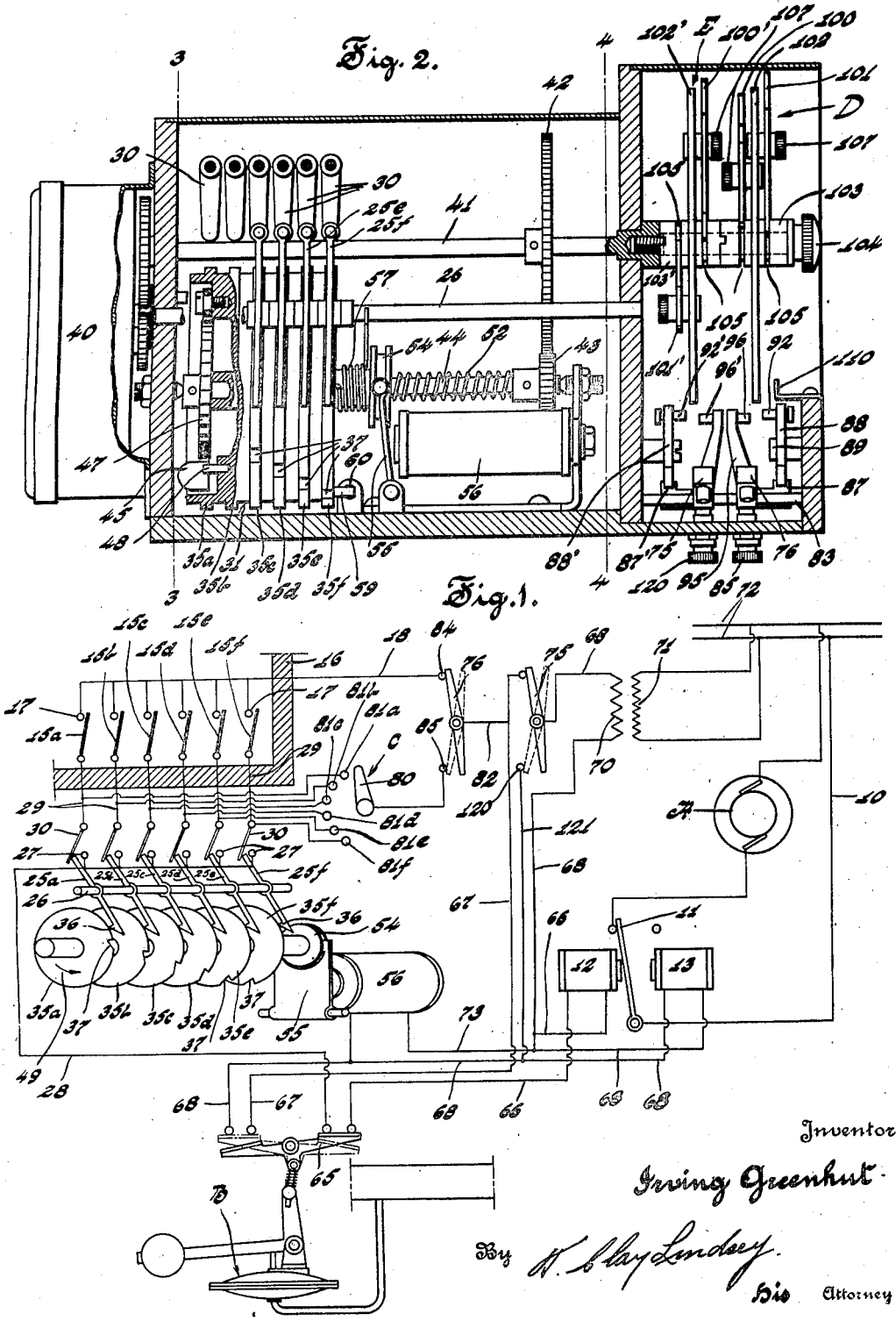
Inventor
Irving Greenhut
By W. Clay Lindsey
His Attorney Patented Oct. 26, 1926.

1,604,342

UNITED STATES PATENT OFFICE.

IRVING GREENHUT, OF HARTFORD, CONNECTICUT.

AUTOMATIC HEAT-REGULATING APPARATUS.

Application filed April 22, 1925. Serial No. 25,163.

This invention relates to heating apparatus and, particularly, to apparatus for regulating the heating plants of houses or buildings, such, for instance, as apartment houses.

It is the present practice to control the temperature of a house or building by a single thermostat placed in a given part of the house. This method is objectionable, particularly when employed in large homes, apartment houses, or the like, because the heat obtaining within the several rooms or apartments varies greatly due to climatic, structural, and other conditions. Various portions of the building lose and gain heat at different rates depending on exposure, size, draughts, etc. Therefore, while the room or portion of the building containing the thermostat may be satisfactory, other portions of the building may be too hot or too cold.

The aim of the present invention is to provide a regulating apparatus by means of which the temperature within the building may be controlled with great nicety, and the building may be uniformly heated independently of local interior conditions. To this end, thermostatic means positioned exteriorly of the building is employed for regulating the heating plant. The thermostatic means is such that the heat generated by the heating plant will vary in accordance with the change in temperature outside of the building.

A further aim is to provide an apparatus of the sort described having various features of novelty and advantage, and which is particularly characterized by its simplicity and effectiveness in operation.

In the present illustrative embodiment of the invention, I have shown my improved apparatus as having thermostatic means preferably located exteriorly of the building and set to successively operate at progressively lower temperatures; a heating plant having a regulator which may be in the form of a draught damper in case of a coal fired plant, or a motor in case of an oil fired plant, or a valve in case of a gas fired plant; time controlled means through which said thermostatic means automatically effects operation of said regulator at predetermined intervals of time, which intervals decrease in length in proportion to the progressively lower temperatures at which the thermostatic means is set to operate; and means controlled by the heat produced by the heating plant for determining the length of time the regulator shall remain in condition to effect a greater heat. I further combine with this apparatus means whereby the regulator may be operated at will or at predetermined times and independently of the thermostatic means and said time controlled means. I also provide means whereby the regulator may be controlled by said time controlled means independently of the thermostatic means.

In the accompanying drawings, wherein I have shown, for illustrative purposes, one embodiment which the present invention may take, it being understood that this showing is by way of exemplification only, as my invention is susceptible of various modifications, changes and applications:

Figure 1 is a diagrammatic layout of my improved apparatus;

Fig. 2 is a side view of the regulating apparatus;

Fig. 3 is a transverse sectional view taken substantially on line 3—3 of Fig. 2;

Fig. 4 is a sectional view taken on line 4—4 of Fig. 2;

Fig. 5 is a right hand elevational view of the structure shown in Fig. 2; and

Fig. 6 is a detail view of a switch which may be set to operate at predetermined times.

In these drawings, I have not shown the heating plant in detail, as my apparatus may be employed in conjunction with any suitable type or construction of heating apparatus, as, for example, a coal, oil or gas heated water or steam boiler plant or an air furnace. The regulator for varying the heating effect of the plant will, of course, depend on the particular type of plant to which my improvements are applied. In the drawings, I have shown the regulator as being in the form of a motor A which may be employed for feeding air or oil or both to an oil heater. The term "regulator" is employed in its generic sense and for convenience in terminology. The motor A is connected in a line 10 provided with a switch 11 which is thrown into circuit closing position by a solenoid 12 and into "off" position by a solenoid 13.

In the present instance, the thermostatic means comprises a plurality of thermostats $15^a$, $15^b$, $15^c$, $15^d$, $15^e$ and $15^f$ located exteriorly of the building, a wall of which is shown at 16. These thermostats may be of the parts are in the positions shown in Fig. 1 of the drawings and that the outside temperature is more than 60°, the clock will drive the drum 31 counterclockwise without resulting in energization of the solenoid because none of the thermostats are closed under the assumed conditions. Now, assume the temperature drops to 55°. The thermostat 15$^f$ will close, and when the detent of the switch 25$^f$ drops into the notch of the right hand cam 35$^f$, the following circuit is closed;—the secondary winding 70, the switch blades 75 and 76, wire 18, thermostat 15$^f$, switch 25$^f$, wire 28, switch arm 65, and wire 66 (in which the solenoid 12 is interposed). When this circuit is closed, the solenoid 12 is energized, resulting in closing of the switch 11 and throwing "on" of the motor, whereupon the heat given out by the heating plant will increase. The motor or regulator A will remain in "on" condition until the temperature of the steam or water within the plant operates the pressure-stat B to throw the switch 65 into the dotted line position of Fig. 1, whereupon the solenoid 13 is energized, with the result that the switch 11 is broken and the regulator is rendered inoperative. At about the same time that the solenoid 13 is energized, the solenoid 56 is also energized, with the result that the cam assembly is drawn to the right by the armature 55, thereby disconnecting the ratchet wheel 47 from the pawl 45 so that the cam assembly is free to be turned clockwise by the spring 57 back to starting position. Since the regulator is now in "off" position, the pressure within the heating plant will drop, whereupon the switch 65 will move to the full line position shown in Fig. 1, thereby breaking the circuit through the solenoid 56, with the result that the spring 52 will slide the cam assembly on the shaft 44 to a position where the ratchet wheel and pawl 45 are again re-engaged. The clock will now rotate the cam assembly counterclockwise until the notch 37 in the cam 35$^f$ is again brought into a position where the detent 36 of the switch 25$^f$ may fall thereinto, whereupon the solenoid 12 is again energized, resulting in throwing the regulator or motor into operation. Under the assumed conditions, the interval of time between the de-energization of the solenoid 56 and the engagement of the pawl or detent 36 in the notch of the cam 35$^f$ is one hour long.

If the temperature of the outside air should drop to say 45°, the thermostat 15$^e$ will close with the result that the regulator will be thrown from "off" into "on" condition when the switch 25$^e$ is closed. It may be assumed that this switch 25$^e$ will be closed fifty minutes after the thermostat has operated to throw the motor A into "on" position; that is to say, the notch in the cam 35$^e$ may be so spaced that it takes fifty minutes for the cam to rotate from starting position to the position where the notch in this cam is beneath the detent of the switch 25$^e$. If the temperature drops to between 30° and 40°, the thermostat 15$^d$ will close, and the cam 35$^d$ will close the switch 25$^d$ say forty minutes after the pressure-stat B has thrown the regulator A out of operation. If the temperature falls to between 20° and 30°, the thermostat 15$^c$ and the switch 25$^c$ will be effective to periodically throw the regulator into operation. If the temperature is between 10° and 20°, the thermostat 15$^b$ and the switch 25$^b$ are effective, and when the temperature drops below 10°, the thermostat 15$^a$ will close and the cam 35$^a$ will result in energization of the solenoid 12 and operation of the motor A ten minutes after the pressure-stat has thrown the motor out of operation.

It is, of course, understood that the specific temperature and time periods hereinbefore referred to are given solely by way of example and to facilitate the understanding of the operation of this device. It is evident that the range of temperatures within which the thermostatic means operate, the temperatures at which the several thermostatic devices operate, the periods of time at which the switches are closed, the number of thermostatic devices, and the number of cams, and other features and settings of the arrangement, may be varied to suit the conditions at hand, these conditions being different for various size buildings, exposures, and uses to which the building are put.

In order that the regulator may be thrown "on" at a given selected interval of time after the regulator is thrown "off", irrespective of the thermostats, the apparatus is provided with a selective device in the form of a manually operable switch C connected to the circuit between the thermostats and the switches 25$^a$, 25$^b$, etc., and a time operated switch D having a switch arm 76 by means of which the thermostatic devices and the selective switch may be cut into and out of operation at any predetermined times. The switch C (see Fig. 1) has a switch arm 80 and a plurality of contacts 81$^a$, 81$^b$, 81$^c$, 81$^d$, 81$^e$, and 81$^f$, respectively connected to the wires 29. The time switch D has the switch arm 76 electrically connected to the wire 67 by a wire 82. This switch arm is pivoted on and insulated from a rod 83 and is adapted to engage at its opposite ends terminals 84 and 85 respectively connected to the line 18 and the switch arm 80. The switch arm is normally urged in the direction of the contact 85 by a spring 86. Extending laterally from the switch arm is a projection 87 with which is adapted to cooperate a latch 88 pivoted on a fixed pin 89 and having a pair of notches 90 and 91. The upper end of the latch carries a pin or abutment 92, and the latch is normally urged to the full line position shown in Fig. 5 by a spring 93. The switch arm carries a bracket 95 having, at its upper end, a pin or projection 96. The latch and switch arm are controlled by a pair of fingers which, in the present instance, are in the form of adjustable hands 100 and 101 connected to a dial 102 driven in any suitable manner, as by means of the clock 40. In the present illustrative disclosure, the dial 102 has a hub 103 through which passes a screw 104 which is threaded into a recess in one end of the clock driven shaft 41. Also located on this screw is the dial of a switch E which, in construction, is substantially identical to the switch D. The dial makes one revolution in twenty-four hours and its face is divided up into twenty-four divisions. The hands may be connected to the dial in any suitable manner, as, for example, the inner ends of the hands may be engaged in circumferential grooves 105 in the hub 103, and the dial may have arcuate slots 106 through which passes clamping bolts 107 carried by the hands.

The operation of the arrangement just described is briefly as follows: Assuming that during the night the building in which my apparatus is installed becomes somewhat cold, it may be desirable to throw the regulator "on" at a shorter interval of time after it has been thrown "off" than would be the case if the outside temperature controlled the regulator through the thermostats in order to bring the temperature of the building more rapidly to the desired degree. For example, the temperature of the outside air may be such that, if the regulator were controlled through the thermostats, the regulator would be thrown "on" fifty minutes by the thermostat 15$^e$ after the regulator has been thrown "off", and it may be desirable to throw the regulator "on" say twenty minutes after it is thrown "off" from six to eight o'clock in the morning. The hands 100 and 101 will be set as shown in Fig. 5. The switch arm 80 of the selective switch will be brought into engagement with the contact 81$^b$. The position of the dial indicates that it is six o'clock p. m., the reading for the time being made at the bottom of the dial. For this purpose, the pointer 110 (see Fig. 2) may be provided. When twelve hours have elapsed; that is, six o'clock in the morning, the hand 101 will engage the pin 92 and thereby throw the latch to a position of the latch shown in Fig. 6. When the latch is thrown to this position, the spring 86 will move the switch arm into engagement with the contact 85, as shown by dotted lines Fig. 1. From six o'clock to eight o'clock, the regulator will be thrown "on" twenty minutes after it is thrown "off" by the pressure-stat, because the current will now pass through the switch arm 75, wire 82, switch arm 76, selective switch arm 80, contact 81$^b$ and switch 25$^b$, all of the thermostats and all of the cam operated switches, except the switch 25$^b$, being cut out of circuit. At eight o'clock in the morning, the hand 100 will engage the pin 96, thereby throwing the switch arm 76 back into the position shown in Fig. 5 and in which position it will be held by the latch 88. Thereafter, the regulator is controlled through the thermostats and cam operated switches, as previously described.

The switch E serves the purpose of throwing the regulator into and out of control of the thermostats and cam operated switches or the cam operated switches alone at predetermined times. For example, during the night, say from ten p. m. to five a. m., it may be desirable to heat the building to a lesser degree than would be the case if the regulator were under the control of the thermostats and, during that time, to maintain the regulator out of operation and then at five o'clock in the morning to automatically throw the regulator under the control of the thermostats. This switch E is practically identical to the switch D and, therefore, the parts thereof corresponding to the parts of the switch D bear corresponding numerals, but the numerals are primed. The operation of the switch E may best be understood from the following concrete example: The hand 100' is set at the twenty-second hour, that is, ten o'clock, on the dial 102', and the hand 101' is set on the numeral five of the dial 102'. Now, when it arrives at ten p. m., the hand 101' throws the latch 88' to the full line position shown in Fig. 6 so that the switch arm engages the contact 120 of a wire 121 leading to the wire 68 and which wire 121 shunts the thermostats and cam operated switches. The current will now flow through the switch arm 75, wire 121 and the solenoid or magnet 13 until five o'clock in the morning and, during that time, the motor A is "off". At five o'clock in the morning, the hand 100' engages the pin 96', whereupon the switch arm 75 is thrown to the full line position shown in Fig. 1. From five a. m. until ten p. m., the motor will now be controlled through the thermostats and cam operated switch while the switch arm 76 is in the position shown in full lines in Fig. 1 and through the selected cam operated switch when the arm 76 is in the dotted line position of Fig. 1.

As many changes could be made in the above construction and many apparently widely different embodiments of the invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

I claim as my invention:

1. In combination, a heating plant having a regulator, a plurality of thermostats set to operate at different temperatures, means affected by the heat of the heating plant for throwing the regulator "off", a plurality of switches one for each thermostat, said thermostats being arranged to effect the throwing "on" of said regulator through said switches, and means for closing said switches at progressively different intervals of time.

2. In combination, a heating plant having a regulator, thermostatic means set to operate at progressively different temperatures, means for throwing said regulator "off", a plurality of switches one for each setting at which said thermostatic means is adapted to operate, said thermostatic means being arranged to effect the throwing "on" of said regulator through the respective switches, and means for closing said switches at progressively different intervals of time after the regulator is thrown "off", said means comprising a plurality of cams adapted to close said switches at progressively different intervals, and means for returning said cams to initial position when the regulator is thrown "off".

3. In combination, a heating plant having a regulator, thermostatic means set to operate at progressively different temperatures, a pressure-stat associated with said heating plant and arranged to throw said regulator "off" when the plant reaches a predetermined temperature, a plurality of switches one for each setting of said thermostatic means, said thermostatic means being arranged to effect operation of said regulator through said switches, and means for closing said switches at progressively different intervals of time after said regulator is thrown "off".

4. In combination, a heating plant having a regulator, a circuit controlling said regulator and including thermostatic means in said circuit set to operate at progressively different temperatures, a pressure-stat, a switch in said circuit operated by said pressure-stat, a plurality of switches arranged in parallel in said circuit and respectively in series with the several settings of said thermostatc means, and means for closing said last mentioned switches at progressively different intervals of time.

5. In combination, a heating plant having a regulator, a circuit controlling said regulator, a plurality of thermostats arranged in parallel in said circuit and set to operate at progressively different temperatures, a switch in said circuit, means affected by the heat of said heating plant for controlling said switch, a plurality of switches arranged in parallel in said circuit and respectively in series with the respective thermostats, and means for closing said last mentioned switches at progressively different intervals of time.

6. In combination, a heating plant having a regulator, a circuit controlling said regulator, a plurality of thermostats arranged in parallel in said circuit and set to operate at progressively different temperatures, a switch in said circuit, means affected by the heat of said heating plant for controlling said switch, a plurality of switches arranged in parallel in said circuit and respectively in series with the respective thermostats, means for closing said last mentioned switches at progressively different intervals of time, and means for returning said last mentioned means to initial position each time the regulator is thrown "off".

7. In combination, a heating plant having a regulator, thermostatic means set to operate at a plurality of different temperatures, a plurality of switches one for each setting at which said thermostatic means is adapted to operate, means for closing said switches at progressively different intervals of time, operative means for returning said last mentioned means to initial position when said regulator is thrown "off", and means affected by the heat of said heating plant for rendering said operative means effective when said regulator is thrown "on" and for rendering said thermostatic means effective when said regulator is thrown "off".

8. In combination, a heating plant having a regulator, a circuit through which said regulator is controlled, a plurality of thermostats arranged in parallel in said circuit, a plurality of switches one for each thermostat, cam means for closing said switches at progressively different intervals, means for driving said cam means, means for disengaging said cam means from said driving means, means for returning said cam means to initial position when said cam means is disengaged from said driving means, a switch in said circuit, a switch controlling said disengaging means, and means affected by the heat of said heating plant and controlling said two last mentioned switches.

9. In combination, a heating plant having a regulator, thermostatic means set to operate at progressively different temperatures, a plurality of devices one for each setting at which said thermostatic means is adapted to operate, said thermostatic means being arranged to effect operation of said regulator through said switches, means for closing said switches at progressively different intervals of time, selective means associated with said switches and shunting said thermostatic means, and a time controlled switch for breaking the circuit through said thermostatic means and making the same through said selective means.

10. In combination, a plurality of thermostats set to operate at progressively different temperatures, a plurality of switches one associated with each thermostat, means for operating said switches at progressively different intervals of time, a manually operable selective switch between said thermostats and switches, and a time controlled switch for controlling the current through said thermostats and selective switch.

11. In combination, a heating plant having a regulator, thermostatic means set to operate at progressively different temperatures, a plurality of switches one for each setting at which said thermostatic means is adapted to operate, said thermostatic means being arranged to effect operation of said regulator through said switches, means for closing said switches at progressively different intervals of time, and a time controlled switch controlling said regulator and arraged to throw said thermostatic means and switches into and out of operation at predetermined times.

12. In combination, a plurality of switches arranged in parallel, cams for operating said switches at progressively different intervals of time, means for driving said cams in one direction, means for disengaging said cams from said driving means, and means for returning said cams to initial position when disengaged from said driving means.

13. In combination, a plurality of switches arranged in parallel and each having a pivoted member, a plurality of cams driven in unison and arrranged to respectively actuate said pivoted members at progressively different intervals of time, clock mechanism for rotating said cams in one direction, means for disengaging said cams from said driving means, and means for rotating said cams in the opposite direction and to initial position when said cams are disengaged from said driving means.

14. In combination, a heating plant having a regulator, thermostatic means set to operate at progressively differenty temperatures, a plurality of devices one for each setting at which said thermostatic means is adapted to operate, said thermostatic means being arranged to effect operation of said regulator through said switches, means for closing said switches at progressively different intervals of time, selective means associated with said switches and shunting said thermostatic means, a time controlled switch for breaking the circuit through said thermostatic means and making the same through said selective means, and a second time controlled switch for governing said regulator independently of said thermostatic means and said devices.

15. In combination, a heating plant having a regulator, a plurality of thermostats set to operate at progressively different temperatures, a plurality of switches one associated with each thermostat, means for operating said switches at progressively different intervals of time, a manually operable selective switch between said thermostats and switches, a time controlled switch for controlling the current through said thermostats and selective switch, and a second time controlled switch arranged to directly throw said regulator "on" and "off" at predetermined times.

16. In combination, a circuit, thermostatic means therein set to operate at predetermined temperatures, means for breaking said circuit at indeterminable periods, means in series with said thermostatic means for closing said circuit at predetermined intervals for each setting of said thermostatic means after the circuit is broken, the intervals of time for the various settings progressively varying from one another.

IRVING GREENHUT.

Oct. 26, 1926.
W. S. HARLEY
DISTRIBUTOR CAP
Filed April 13, 1922
1,604,349
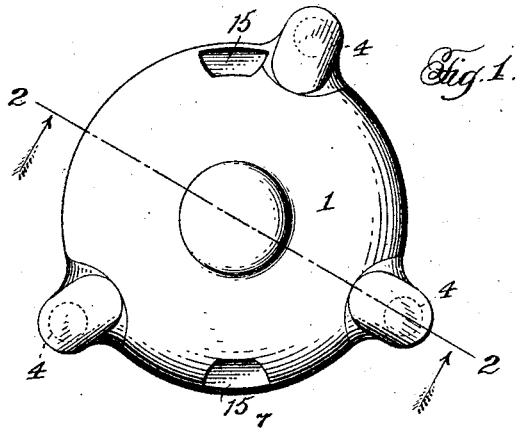
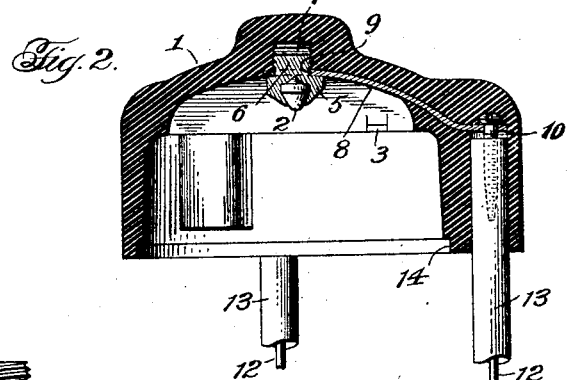
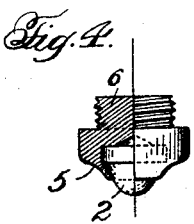
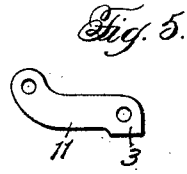
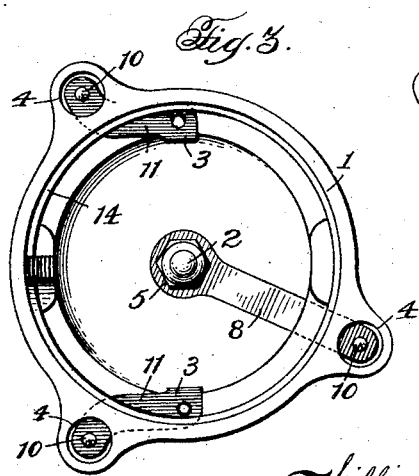
Inventor:
William S. Harley,
By Edwin B. H. Tower
Attorney
Witness:
Jas. E. Hutchinson